[12] United States Patent
Boehmer et al.

(10) Patent No.: US 10,886,837 B2
(45) Date of Patent: Jan. 5, 2021

(54) VIRTUAL CAPACITOR

(71) Applicant: The Johns Hopkins University, Baltimore, MD (US)

(72) Inventors: Tyler J. Boehmer, Columbia, MD (US); Deanna K. Temkin, Silver Spring, MD (US)

(73) Assignee: The Johns Hopkins University, Baltimore, MD (US)

(*) Notice: Subject to any disclaimer, the term of this patent is extended or adjusted under 35 U.S.C. 154(b) by 91 days.

(21) Appl. No.: 16/238,968

(22) Filed: Jan. 3, 2019

(65) Prior Publication Data
US 2019/0280588 A1  Sep. 12, 2019

Related U.S. Application Data

(60) Provisional application No. 62/640,668, filed on Mar. 9, 2018.

(51) Int. Cl.
| | | |
|---|---|---|
| *H02M 1/32* | (2007.01) | |
| *H02M 1/44* | (2007.01) | |
| *H02M 7/04* | (2006.01) | |
| *H02J 7/34* | (2006.01) | |

(52) U.S. Cl.
CPC .............. *H02M 1/32* (2013.01); *H02J 7/345* (2013.01); *H02M 1/44* (2013.01); *H02M 7/04* (2013.01)

(58) Field of Classification Search
CPC .. H02M 1/32; H02M 1/44; H02M 7/04; H02J 7/345; H02J 1/14
See application file for complete search history.

(56) References Cited

U.S. PATENT DOCUMENTS

| | | | | |
|---|---|---|---|---|
| 4,196,711 A | * | 4/1980 | Daumer ................. | F02P 3/051 123/644 |
| 5,801,583 A | * | 9/1998 | Zierhut ................. | H04B 3/548 327/538 |
| 9,812,864 B2 | | 11/2017 | Temkin et al. | |
| 2005/0263331 A1 | * | 12/2005 | Sopko ................. | H01M 10/482 180/65.1 |
| 2010/0156180 A1 | * | 6/2010 | Nishiyama .............. | H02J 7/345 307/46 |
| 2015/0340882 A1 | * | 11/2015 | Goth ...................... | H02J 7/007 320/167 |
| 2017/0149369 A1 | * | 5/2017 | Watabu .................. | H02J 7/007 |
| 2017/0229994 A1 | * | 8/2017 | Sawamura .............. | H02M 7/06 |
| 2018/0076646 A1 | * | 3/2018 | Lindsay .................. | G05F 1/56 |
| 2018/0310376 A1 | * | 10/2018 | Huang .................. | H05B 45/10 |
| 2019/0013753 A1 | * | 1/2019 | Wang ...................... | F03D 9/11 |

* cited by examiner

*Primary Examiner* — Pinping Sun
(74) *Attorney, Agent, or Firm* — Noah J. Hayward

(57) ABSTRACT

An example virtual capacitor including processing circuitry, a physical capacitor, and a bi-directional current source is provided. The bi-directional current source may be electrically coupled between the physical capacitor and a power distribution bus. The control circuitry may be configured to control the bi-directional current source and the physical capacitor to emulate a shunt capacitor electrically connected to the power distribution bus with a different capacitance than a capacitance of the physical capacitor by controlling a voltage across the physical capacitor to be within a physical capacitor voltage range that is different than an operating bus voltage range.

17 Claims, 6 Drawing Sheets

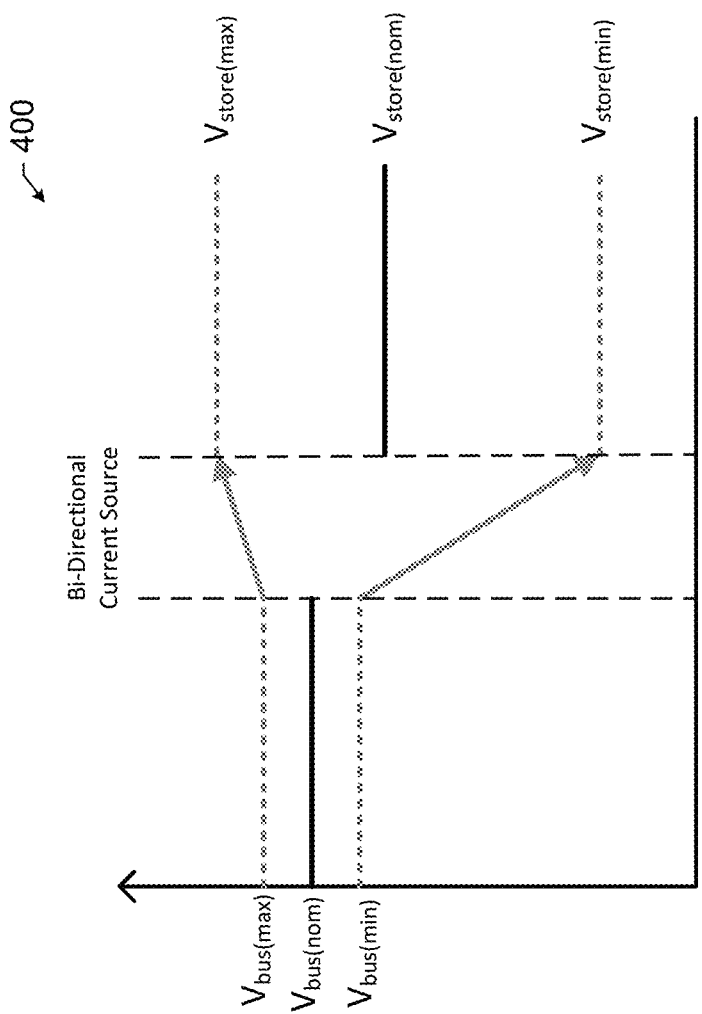

VIRTUAL CAPACITOR

CROSS-REFERENCE TO RELATED APPLICATIONS

This application claims priority to and the benefit of prior-filed U.S. Provisional Application Ser. No. 62/640,668, filed Mar. 9, 2018, the content of which is herein incorporated by reference in its entirety.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Example embodiments generally relate to power systems and, in particular, relate to systems for emulating a bus shunt capacitor.

BACKGROUND

Power distribution systems often include a power distribution bus that is operated at a certain nominal voltage, or within a bus voltage operational range, to support the load served by the bus. Such loads may include dynamic loads capable of introducing voltage transients and fluctuations on the power distribution bus, such as, for example, high-energy sensors or energy-based weapons, which may be deployed on platforms including ships, planes, satellites, or the like. Electromagnetic Aircraft Launch System (EMALS) and rail guns may be some specific examples of loads that may exhibit these attributes. These dynamic loads may quickly consume a large portion of the platform's electrical power resources and thereby cause extreme power and voltage transients and fluctuations on the power distribution bus. Power distribution systems are often designed to attempt to maintain well-regulated voltages by filtering such load dynamics minimizing transients and fluctuations in the voltage.

As such, while many conventional power distribution systems attempt to maintain well-regulated voltages when these dynamic loads are present on the power distribution bus, in some situations, conventional systems are not capable of doing so. Conventional systems may employ techniques that attempt to minimize output impedance of the bus by using, for example, one or more large shunt capacitors connected to the bus to filter the transients and fluctuations on the bus. However, for these shunt capacitors to be effective at filtering the transients and fluctuations introduced by such highly dynamic loads, the capacitors are required to have very high capacitance in Farad values. Unfortunately, as capacitance increases, the physical size and weight of the capacitor also increases. As such, shunt capacitors utilized to filter the transients and fluctuations introduced by some dynamic loads can have substantial space and weight requirements. The space and weight support required for these shunt capacitors can be particularly problematic in space constrained applications such as on a ships, planes, satellites, or the like. In some of these applications, the weight and space requirements for such a shunt capacitor connected to the power distribution bus simply cannot be supported by the platform because such as large and heavy capacitor may inhibit mission critical requirements of the platform.

BRIEF SUMMARY OF SOME EXAMPLES

According to some example embodiments, a virtual capacitor is provided. The virtual capacitor may comprise processing circuitry, a physical capacitor, and a bi-directional current source electrically coupled between the physical capacitor and a power distribution bus. The power distribution bus may be configured to have an operating bus voltage range from a minimum bus voltage to a maximum bus voltage. The control circuitry may be configured to control the bi-directional current source and the physical capacitor to emulate a shunt capacitor electrically connected to the power distribution bus with a different capacitance than a capacitance of the physical capacitor by controlling a voltage across the physical capacitor to be within a physical capacitor voltage range that is different than the operating bus voltage range.

According to some example embodiments, a power system implementing a virtual capacitor is provided. The power system may comprise an alternating current (AC) generator, an AC to direct current (DC) converter, control circuitry, a physical capacitor, and a bi-directional current source. The AC to DC converter may be coupled between the generator and a dynamically changing load and an output of the AC to DC converter may be electrically coupled to a power distribution bus. The bi-directional current source may be electrically coupled between the physical capacitor and the power distribution bus. The control circuitry is configured to control the bi-directional current source and the physical capacitor to emulate a shunt capacitor electrically connected to the power distribution bus with a different capacitance than a capacitance of the physical capacitor by controlling a voltage across the physical capacitor to be within a physical capacitor voltage range that is different than an operating bus voltage range.

According to some example embodiments, a method for implementing a virtual capacitor is provided. The method may comprise determining an energy difference value between energy stored in a physical capacitor and energy for a power distribution bus. The energy stored in the physical capacitor may be based on a physical capacitor voltage and the energy for the power distribution bus may be based on a bus voltage. The method may also comprise generating a reference current based on the energy difference value, and controlling, by control circuitry, a bi-directional current source and a physical capacitor with the reference current to emulate a shunt capacitor electrically connected to the power distribution bus with a different capacitance than a capacitance of the physical capacitor by controlling a voltage across the physical capacitor to be within a physical capacitor voltage range that is different than the operating bus voltage range.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIGS. 4A and 4B illustrate notional graphs of some example relationships between the operating bus voltage range and the physical capacitor voltage range according to an example embodiment.

DETAILED DESCRIPTION

Figure 1:
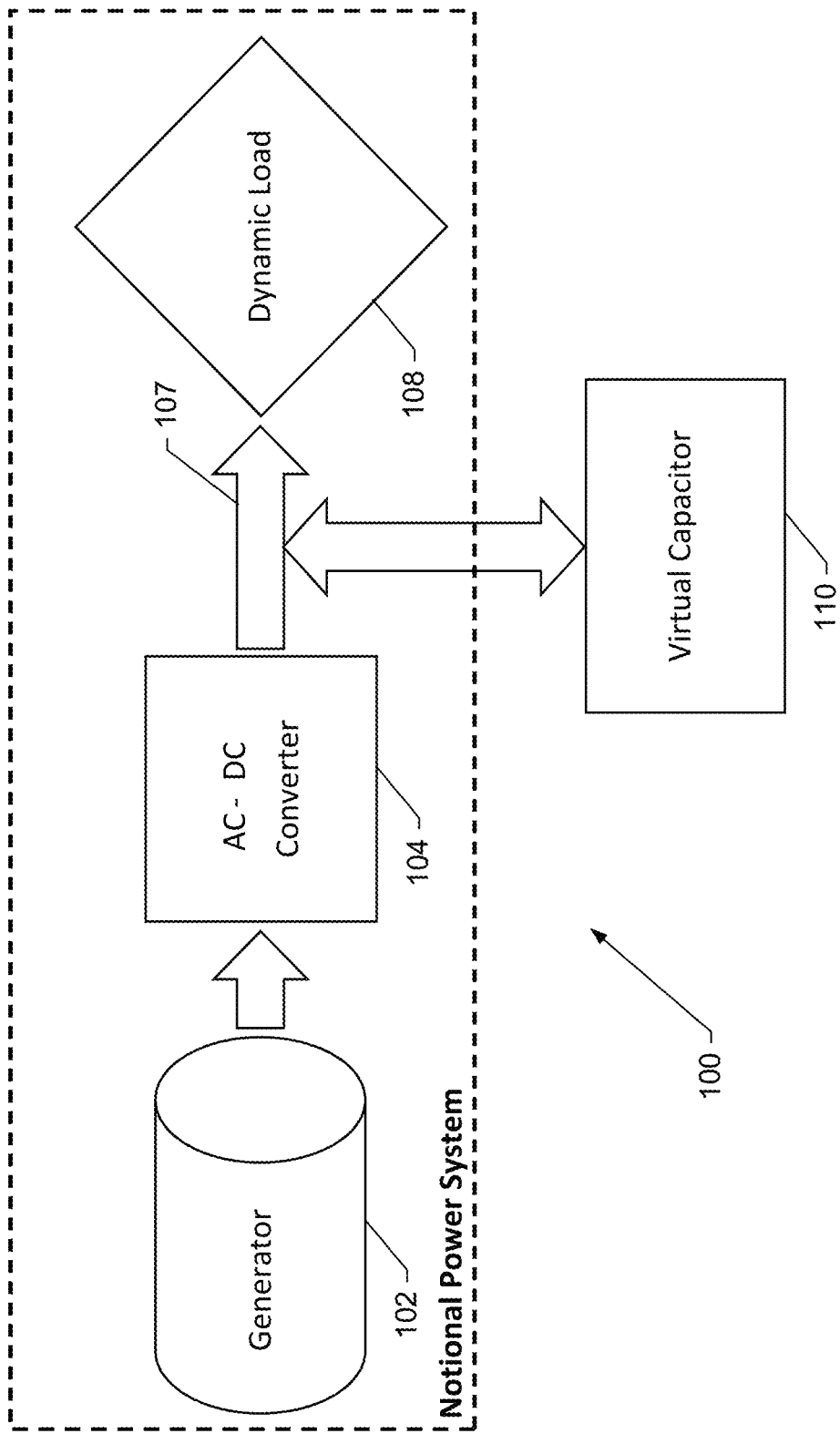
FIG. 1 illustrates an example notional power system with a virtual capacitor according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As mentioned above, dynamic loads can introduce significant transients and bus voltage fluctuations onto the power distribution bus, particularly when loads quickly change. Dynamically changing loads may be associated with a variety of electrical devices that exhibit non-constant load profiles. Some devices that exhibit wide swings in load requirements include electromagnetic railguns, energy lasers, unmanned vehicles, and drilling rigs. Many conventional power systems employ a physical capacitor connected in shunt to the power distribution bus to assist with filtering such transients and fluctuations to maintain a stable bus voltage. However, because the physical capacitor is connected in shunt (i.e., electrically connected directly to the power distribution bus), the voltage range used by the capacitor is limited by the operating bus voltage range. Due to this limitation, the capacitance of such a shunt connected physical capacitor may need to be quite high to support the amount of energy needed to be absorbed or delivered to provide the required filtering in the presence of, for example, a dynamic load. Physical capacitors with high capacitance can be very large and heavy and therefore introduce issues, or may even be unavailable for use, in many applications that have size and weight limitations, such as in ships, planes, satellites, or the like.

In view of this, a power system is provided that implements a "virtual capacitor" that operates to emulate a physical shunt capacitor connected to the bus, and can realize benefits in the form of size and weight reductions. Such a virtual capacitor may, according to some example embodiments, employ a physical capacitor that is not directly connected to a power distribution bus, but is connected to the power distribution bus through a controllable, bi-directional current source. The bi-directional current source may operate to, in some respects, isolate the physical capacitor from the power distribution bus to permit the voltage across the physical capacitor to differ from the bus voltage and, for example, swing across a wider range then would be available if the physical capacitor was connected directly to the power distribution bus in shunt.

According to some example embodiments, the bi-directional current source that is connected to the physical capacitor may be controlled via control circuitry that responds to changes in the bus voltage. As such, based on the bus voltage, the control circuitry may control the bi-directional current source to apply an appropriate voltage across the physical capacitor to, for example, maintain the operational voltage range of the bus and filter the dynamic load. However, because the voltage across the physical capacitor may differ from the bus voltage, the physical capacitor may have a relatively small capacitance but the increased voltage range across the physical capacitor may permit a larger amount of energy to be absorbed or delivered to the power distribution bus. As such, according to some example embodiments, this virtual capacitor may include a physical capacitor with a relatively low capacitance, but may still emulate the operation of a much larger capacitor that would be connected to the power distribution bus in shunt. Because the voltage across the capacitor is not limited by the operating bus voltage range and is permitted to have a different voltage range of operation, the capacitor may still meet the energy-storage requirements needed to filter the load dynamics. Also, since the capacitance of the physical capacitor can be lower, the size and weight of the capacitor can be substantially less than a conventional shunt capacitor that would operate similarly, thereby providing a technical solution for applications where large, heavy physical capacitors are undesirable or not feasible, thereby supporting applications including localized power systems or space-constrained platforms such as shipboard power systems.

As such, according to some example embodiments, to provide electric power to such loads, an example virtual capacitor may be utilized. The virtual capacitor may be electrically coupled to a power distribution bus in shunt between the power distribution system source (e.g., generator with rectifier) and the dynamic load. Further, the example virtual capacitor may be configured to maintain the voltage on the power distribution bus within an operational bus voltage range as the load changes. By maintaining the bus voltage within the operating range on the power distribution bus by absorbing or delivering current as needed to support the load demand, the virtual capacitor may mitigate bus disturbances and reduce stress on generators thereby avoiding problems that may occur if the power system was required to support the dynamic load without compensation.

FIG. 1 illustrates an example notional power system 100 with virtual capacitor 110 according to an example embodiment. In an example embodiment, a platform, such as a vehicle, may include the notional power system 100. The notional power system 100 may include a generator 102, an alternating current (AC) to direct current (DC) converter 104, a DC bus 107, and a dynamic load 108. The generator 102 may be a steam turbine, gas turbine, jet turbine type generator, diesel generator, or other generator configured to supply power to the platform. The generator 102 may output 300 VAC, 450 VAC, 4160 VAC, or the like. The AC-to-DC converter 104 may be a solid state rectifier, such as a diode rectifier, an active power factor, or the like, configured to convert the AC power generated by the generator 102 to DC. In an example embodiment, the generator may output 450 VAC, which may be converted to 375 VDC by the AC-to-DC converter 104 and output to the DC bus 107, which in turn supplies the dynamic load 108.

As discussed above the dynamic load 108 may cause extreme variations to the voltage on the DC bus 107. In an example embodiment, the virtual capacitor 110 may be electrically connected to the DC bus 107 in shunt. The virtual capacitor 110 may include a physical capacitor or physical capacitor bank, a bi-directional current source, and control circuitry, as further described below. In an example embodiment, the energy stored in the physical capacitor, of the virtual capacitor 110, may be regulated via control of the bi-directional current source to maintain the bus voltage within an operational range.

The power distribution bus 107 may be configured to deliver energy to the dynamic load 108 from the generator 102 and the AC-to-DC converter 104. As such, the power distribution bus 107 may be operated within an operating bus voltage range in DC to support proper power delivery to the dynamic load 108. The operating bus voltage range may be determined based on the sensitivity to over or under-voltage by the generator 102 or the dynamic load 108. Accordingly, the operating bus voltage range may range between a bus maximum voltage and a minimum bus voltage.

Figure 2:
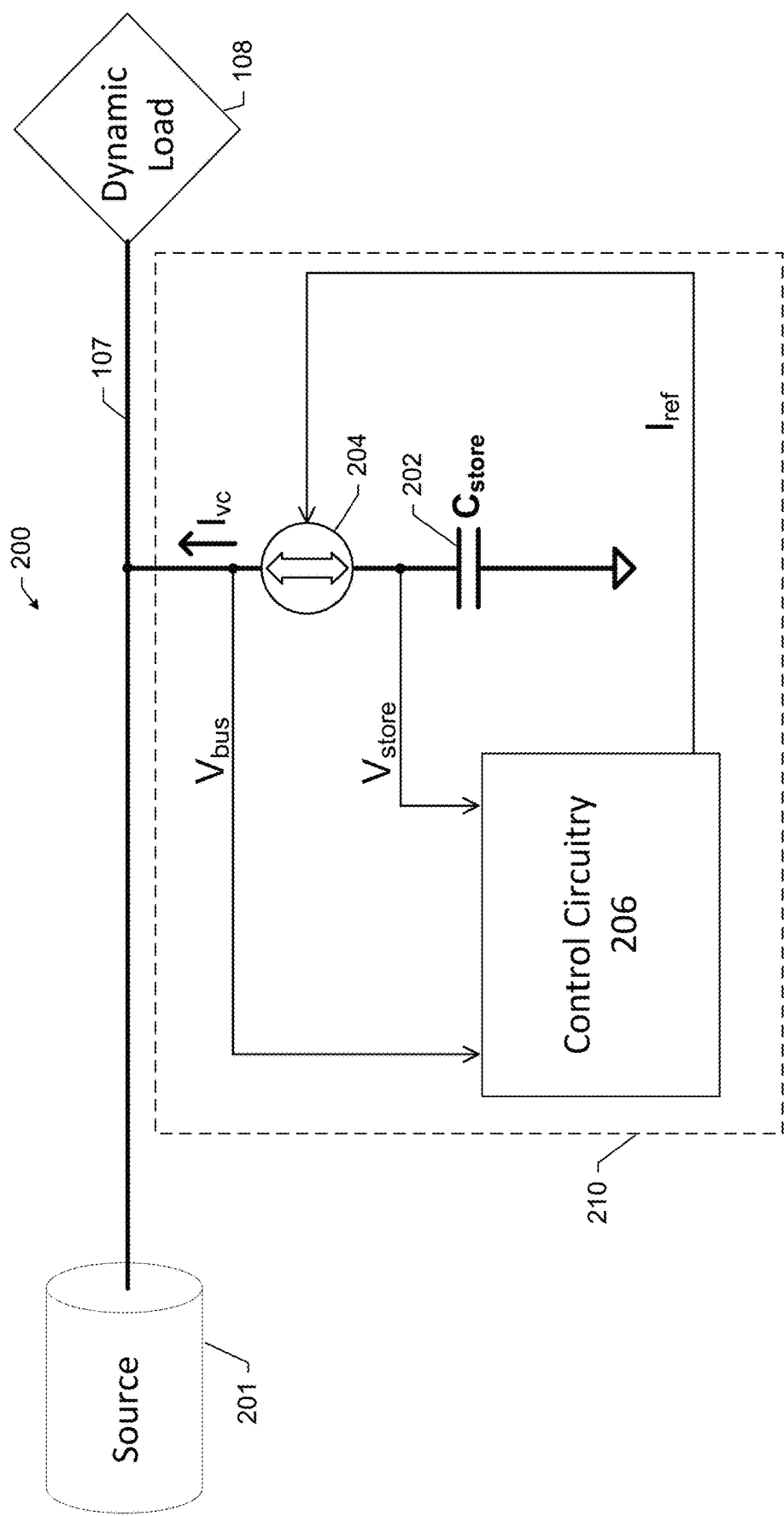
FIG. 2 illustrates an example power system with a virtual capacitor comprising control circuitry to control a bi-directional current source and a physical capacitor according to an example embodiment.

FIG. 2 illustrates another power system 200 that is a variation of the power system 100. In this regard, the power system 200 includes a source 201, a distribution power bus 107, and virtual capacitor 210. The source 201 may be any type of a generator (e.g., generator 102) which may be electrically connected to dynamic load 108 via power distribution bus 107, as described above.

The virtual capacitor 210, which may be the same or similar to the virtual capacitor 110, may be connected to the distribution power bus 107 in shunt. The virtual capacitor 210 may comprise a physical capacitor 202, a bi-directional current source 204, and control circuitry 206. The physical capacitor 202, also referred to as Cstore, may be a single physical capacitor or a bank of physical capacitors. The physical capacitor 202 may be any type of physical capacitor technology such as, for example, an electrolytic capacitor. In some example embodiments, the physical capacitor 202 may be a super capacitor. According to some example embodiments, the physical capacitor 202 may be sized, based on the energy needed to filter the transients and fluctuations that are expected to be introduced to the power distribution bus 107 by, for example, the dynamic load 108, and an allowable voltage range for the physical capacitor 202 (i.e., the operating physical capacitor voltage range). In this regard, as further described below, the physical capacitor voltage range and the capacitance of the physical capacitor 202 may be related for determining an appropriately sized physical capacitor for, for example, performing filtering on the power distribution bus 107. The physical capacitor 202 may be electrically connected between the bi-directional current source 204 and ground.

The bi-directional current source 204 may be electrically connected in series between the power distribution bus 107 and the physical capacitor 202. The bi-directional current source 204 may be constructed of circuitry that may include operational amplifiers, power switching transistors, magnetics, and filters configured to operate as a controllable current source to deliver current to the power distribution bus 107 from the physical capacitor 202 or sink current from the power distribution bus 107 to the physical capacitor 202. According to some example embodiments, the bi-directional current source 204 may employ any bi-directional current source topology including, for example, a bi-directional buck topology. In some example embodiments, the bi-directional current source 204 may be a DC/DC converter that may drive current in both directions (i.e., to the physical capacitor 202 from the power distribution bus 107 or from the physical capacitor 202 to the power distribution bus 107). Under the control of control circuitry 206, the bi-directional current source 204 may operate to provide an output current ($I_{vc}$) referenced in the direction towards the power distribution bus 107 to support the load dynamics thereby, for example, significantly reducing the corresponding bus voltage transients. The control circuitry 206 may, according to some example embodiments, be physically embodied in a variety of ways to support the receipt of inputs to the control circuitry 206 (e.g., the bus voltage and the voltage across the physical capacitor 202) and supply the output of the control circuitry 206 (e.g., a desired sink or source current) to control the bi-directional current source 204. For example, the control circuitry 206 may be comprised of an assembly of operational amplifiers, transistors, and other passive components configured to perform the operations described herein. The control circuitry may also include digital electronics and associated control laws to control the bi-directional current source such as, some or all of the functionality of the control circuitry 206 may be performed by a programmed field programmable gate array (FPGA) or an application specific integrated circuit (ASIC). Still, according to some example embodiments, processing circuitry 206 including a processor and a memory may be used to implement some or all of the functionality of the control circuitry 206 described herein. In this regard, the processing circuitry may be hardware or software configured to perform the functionalities described herein.

As shown in FIG. 2, the control circuitry 206 may be configured to measure the bus voltage ($V_{bus}$) and the voltage across the physical capacitor 202 ($V_{store}$). Based on the these voltages, the control circuitry 206 may be configured to provide an output to the bi-directional current source 204 in the form of, for example, a command or reference current ($I_{ref}$). According to some example embodiments, via control of the output to the bi-directional current source 204, the control circuitry 206 may control the voltage across the physical capacitor 202. To do so, a characteristic relationship between the bus voltage and the voltage across the physical capacitor 202 may be defined, as further described below. For example, the control circuitry 206 may control the bi-directional current source 204 to pull energy from the power distribution bus 107 as the bus voltage increases by increasing the voltage across the physical capacitor 202 and causing the physical capacitor 202 to absorb energy from the power distribution bus 107. In this scenario, the voltage across the physical capacitor 202 may be controlled to be higher than the bus voltage, and in some instances, higher than the maximum bus voltage of the operating bus voltage range. On the other hand, the control circuitry 206 may also control the bi-directional current source 204 to push energy to the power distribution bus 107 as the bus voltage decreases by decreasing the voltage across the physical capacitor 202 and causing the physical capacitor 202 to deliver energy to the power distribution bus 107. In this scenario, the voltage across the physical capacitor 202 may be controlled to be lower than the bus voltage, and in some instances, lower than the minimum bus voltage within the operating bus voltage range. As such, according to some example embodiments, the output of the control circuitry 206 provided to the bi-directional current source 204 may be a function of the bus voltage and the voltage across the physical capacitor 202 with the bus voltage being utilized to determine an amount of energy needed to support the power distribution bus 107 and the voltage across the physical capacitor 202 being utilized to determine the amount of energy currently stored in the physical capacitor 202. Further, according to some example embodiments, the relationship between the minimum and maximum bus voltage and the minimum and maximum physical capacitor voltage (i.e., the voltage across the physical capacitor 202) may be such that the energy needs of the power distribution bus 107 may satisfied. As such, depending on, for example, the capacitance of the physical capacitor and the bus voltage range, the maximum or minimum physical capacitor voltages may be higher or lower than the maximum or minimum bus voltages.

Figure 3:
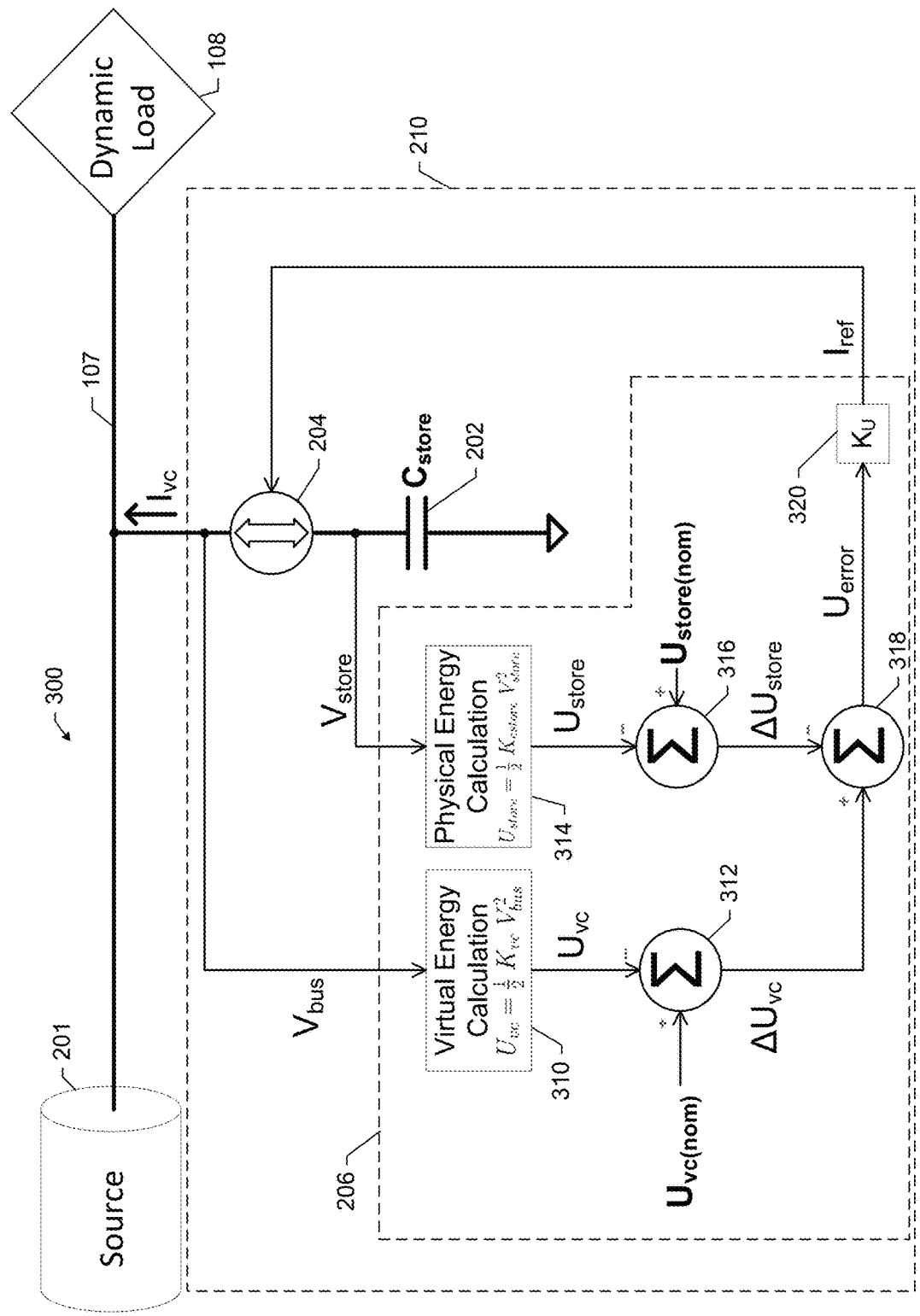
FIG. 3 illustrates an example power system with a virtual capacitor comprising functional blocks describing the operation and structure of the virtual capacitor according to an example embodiment.

To further describe the operation of the control circuitry 206, FIG. 3 provides a functional diagram of the operations that may be performed by the control circuitry 206, according to some example embodiments. In this regard, the control circuitry 206 of the virtual capacitor 210 may obtain a measurement of the bus voltage ($V_{bus}$) and perform a virtual energy calculation at 310. The virtual energy calculation may be $U_{vc}$½ $K_{vc}$ $V_{bus}^2$, where $U_{vc}$ is the energy required by the power distribution bus 107 (also referred to as the virtual capacitor energy), $K_{vc}$ is the virtual capacitor capacitance (i.e., the capacitance of the virtual capacitor from the perspective of the power distribution bus 107 in, for example, Farads), and $V_{bus}$ is the bus voltage. A deviation from the nominal virtual capacitor energy may then be calculated based on the virtual capacitor energy $U_{vc}$. In this regard, the virtual capacitor energy $U_{vc}$ may be negated and summed at 312 with the virtual capacitor nominal energy $U_{vc(nom)}$ to determine a virtual capacitor energy deviation from nominal $\Delta U_{vc}$. The virtual capacitor nominal energy may be calculated at, for example, a maximum bus voltage.

The control circuitry 206 may also be configured to perform a physical energy calculation $U_{store}$. In this regard, the physical energy calculation may be $U_{store}$=½ $K_{cstore}$ $V_{store}^2$, where $U_{store}$ is the physical capacitor (i.e., physical capacitor 202) energy estimation, $K_{cstore}$ is the physical capacitor capacitance (e.g., in Farads), and $V_{store}$ is the voltage across the physical capacitor 202 as measured by the control circuitry 206. A deviation from the nominal physical capacitor energy may then be calculated based on the physical capacitor energy estimation $U_{store}$. In this regard, the physical capacitor energy estimation $U_{store}$ may be negated and summed at 316 with the physical capacitor nominal energy $U_{store(nom)}$ to determine a physical capacitor energy deviation from nominal $\Delta U_{store}$. The physical capacitor nominal energy $U_{store(nom)}$ may be calculated at, for example, a maximum physical capacitor voltage of the physical capacitor voltage range.

The physical capacitor energy deviation from nominal $\Delta U_{store}$ may be negated and summed at 318 with virtual capacitor energy deviation from nominal $\Delta U_{vc}$ to determine an energy difference $U_{error}$. The energy difference $U_{error}$ may be combined with (e.g., multiplied by) a gain factor $K_u$ at 320 to generate the desired sink or source current $I_{ref}$. The gain factor may be implemented by the control circuitry 206, which may be configured to operate as proportional control, proportional integral control, proportional integral derivative control, or other transfer functions that can be chosen to achieve desired stability margins and desired response. The desired sink or source current $I_{ref}$ may be provided to the bi-directional current source 204 as a control input. In response, the bi-directional current source 204 may control the voltage across the physical capacitor 202 $V_{store}$ to source current or sink current from the power distribution bus 107 such that the actual sink or source current $I_{vc}$ emulates the current that would flow from a shunt capacitor tied directly to the bus with a capacitance value equal to $K_{vc}$.

As such, the bus voltage $V_{bus}$ and the voltage across the physical capacitor 202 $V_{store}$ may be used as inputs to the control circuitry 206 to determine the desired sink or source current $I_{ref}$ needed to support the operation of the power distribution bus 107 within the bus voltage tolerance limits (i.e., between the maximum bus voltage $V_{bus(max)}$ and the minimum bus voltage $V_{bus(min)}$). In this manner, the physical capacitor 202 may be made to emulate a larger shunted capacitor, $K_{vc}$, having a larger capacitance, by controlling the voltage across the physical capacitor 202 $V_{store}$ in a manner that permits the voltage across the physical capacitor 202 $V_{store}$ to a range that is different from the operating bus voltage range. For example, the voltage across the physical capacitor 202 $V_{store}$ may be higher than the maximum bus voltage $V_{bus(max)}$ or lower than the minimum bus voltage $V_{bus(min)}$. The voltage range permitted for the physical capacitor 202 may be referred to as the physical capacitor voltage range which may span from a maximum physical capacitor voltage $V_{store(max)}$ to the minimum physical capacitor voltage $V_{store(min)}$.

Based on the foregoing, the virtual capacitor capacitance $K_{vc}$ may be the capacitance of the a shunt capacitor that is being emulated by the virtual capacitor 210, and, according to some example embodiments, this capacitance may be selected during system design for a particular application (e.g., based on the transients and fluctuations introduced by the dynamic load 108). As such, the selection of the capacitance $K_{vc}$ may be based on the requirements of the operational bus voltage range. However, in some example embodiments, physical factors may be additionally or alternatively considered. In this regard, for example, a type or technology of the physical capacitor 202 may desirable for size and weight considerations. In some example applications, a particular capacitor technology may be attractive due to, for example, weight and size considerations, and different capacitor technologies may be supported by the ability to decouple the physical capacitor voltage from the bus voltage. As such, according to some example embodiments, a physical capacitor that operates in the physical capacitor voltage range may meet the size and weight requirements for an application, but may also have a higher capacitance $K_{cstore}$ than the capacitance of the virtual capacitor $K_{vc}$. In this regard, it is often the case that physical capacitors based on a common capacitor technology will increase in size and weight as the capacitance of the physical capacitors increase. However, when different capacitor technologies are available, it may be the case that a physical capacitor of a first technology may have a higher capacitance than a physical capacitor of a second technology, but be smaller and weigh less than the physical capacitor of the second technology. Accordingly, by permitting the physical capacitor voltage to be different than the bus voltage, a variety of options for physical capacitor capacitance and capacitor technologies may be made available as design options in applications that would not be available if a virtual capacitor, according to some example embodiments, was not employed and, rather, a physical capacitor was connected directly to the bus in shunt.

Referring now to FIG. 4A, a graph 400 of an example relationship between the operating bus voltage range and a physical capacitor voltage range is provided. The vertical axis is defined with respect to voltage values and the horizontal axis places the voltage values in visual proximity to show the relationship between the bus voltage and the voltage across the physical capacitor 202. As can be seen in the graph 400 the operating bus voltage range (i.e., between the maximum bus voltage $V_{bus(max)}$ and the minimum bus voltage $V_{bus(min)}$) is shown with the bus nominal bus voltage $V_{bus(nom)}$ being disposed in between (e.g., located centrally). Moving from left to right on the graph 400, the effect of the bi-directional current source 204 is shown which enables the voltage across the physical capacitor 202 to, in this example, have a wider or larger voltage range to support the emulation of a larger shunt capacitor as described herein. As can be seen, the maximum physical capacitor voltage $V_{store(max)}$ is higher, in this example, than the maximum bus voltage $V_{bus(max)}$ and the minimum physical capacitor voltage $V_{store(min)}$ is lower than the minimum bus voltage $V_{bus(min)}$ in this example. Additionally, according to some example embodiments, the bus nominal voltage $V_{bus(nom)}$ may differ from the nominal voltage across the physical capacitor 202 $V_{store(nom)}$ (e.g., the nominal voltage across the physical capacitor 202 $V_{store(nom)}$ is, in this example, lower than the bus nominal voltage $V_{bus(nom)}$ and, in some instances, may be lower than the minimum bus voltage $V_{bus(min)}$).

Figure 4B:
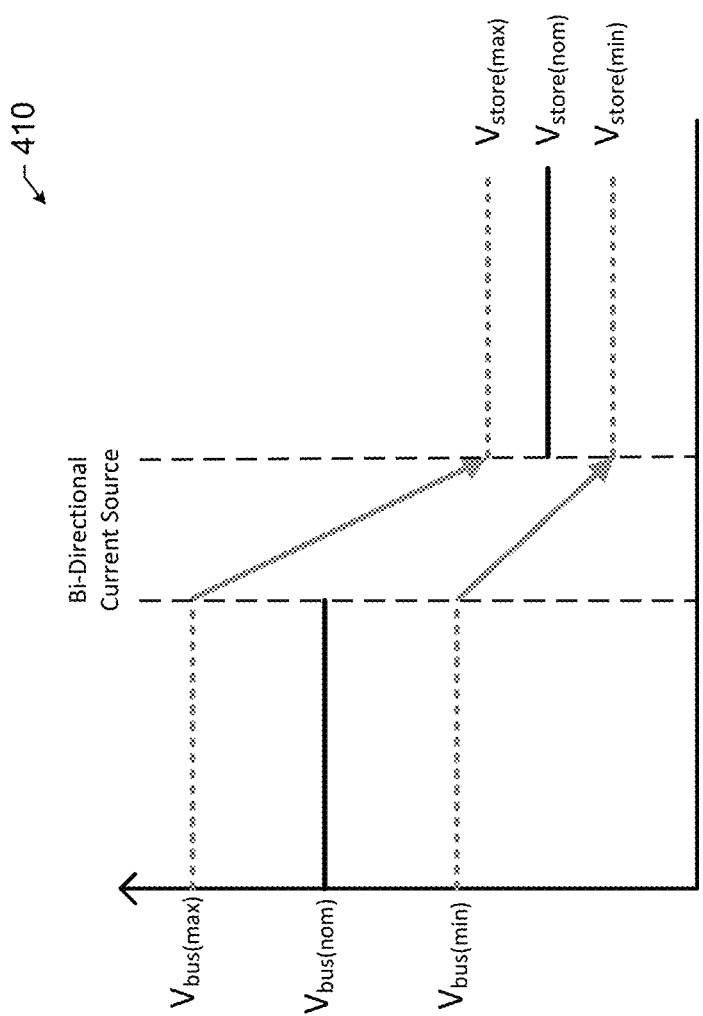

Referring now to FIG. 4B, a graph 410 of another example relationship between the operating bus voltage range and a physical capacitor voltage range is provided. Similar to FIG. 4A, the vertical axis is defined with respect to voltage values and the horizontal axis places the voltage values in visual proximity to show the relationship between the bus voltage and the voltage across the physical capacitor 202. As can be seen in the graph 410 the operating bus voltage range (i.e., between the maximum bus voltage $V_{bus(max)}$ and the minimum bus voltage $V_{bus(min)}$) is shown with the bus nominal bus voltage $V_{bus(nom)}$ being disposed in between (e.g., located centrally). Moving from left to right on the graph 410, the effect of the bi-directional current source 204 is shown which enables the physical capacitor voltage range to, in this example, be shifted lower than the operating bus voltage range. Also, the physical capacitor voltage range is, in this example, narrower than the operating bus voltage range. As can be seen, the maximum physical capacitor voltage $V_{store(max)}$ and the minimum physical capacitor voltage $V_{store(min)}$ are both lower, in this example, than the minimum bus voltage $V_{bus(min)}$. Additionally, according to some example embodiments, the bus nominal voltage $V_{bus(nom)}$ may again differ from the nominal voltage across the physical capacitor 202 $V_{store(nom)}$ (e.g., the nominal voltage across the physical capacitor 202 $V_{store(nom)}$ is, in this example, lower than the bus nominal voltage $V_{bus(nom)}$ and the minimum bus voltage $V_{bus(min)}$). According to some example embodiments, the capacitance of the physical capacitor 202 ($K_{cstore}$) may be larger than the virtual capacitor capacitance ($K_{vc}$), but, due to the relative voltage ranges, the physical capacitor 202 may be able to store sufficient energy. An example application, such as one associated with the graph 410, may be advantageous to allow use of a different capacitor technology at lower voltages that, for example, may offer more efficient packaging characteristics than capacitor technology that may be required for a capacitor connected directly to, in this example, the higher voltage distribution bus, thereby saving weight and space.

In consideration of the graphs 400 and 410, the relationship between the bus voltage and the voltage across the physical capacitor 202 may be expressed with respect to usable energy. As an emulation of a larger shunt capacitor connected to the power distribution bus 107, the physical capacitor 202 may be operated to provide the same amount of usable energy to power distribution bus 107 that the larger shunt capacitor would be capable of providing. In consideration of this principle, the following equations can be considered:

$$U_{store(useable)} = \tfrac{1}{2} K_{cstore}(V_{store(max)}^2 - V_{store(min)}^2)$$

$$U_{bus(useable)} = \tfrac{1}{2} K_{vc}(V_{bus(max)}^2 - V_{bus(min)}^2)$$

If it is assumed that the bi-directional current source 204 is 100% efficient, then $U_{bus(useable)} = U_{atore(useable)}$. Accordingly, by combining these equations, a relationship between the operating bus voltage range and the physical capacitor voltage range may be defined as a function of the virtual capacitor capacitance value Kv and the physical capacitor capacitance value $K_{cstore}$. As such, the control circuitry 206 may be configured to determine and cause the physical capacitor 202 to operate within physical capacitor voltage that is determined from the operating bus voltage range, the capacitance needed to support the power distribution bus 107 if a shunt capacitor were employed, i.e., the virtual capacitor capacitance value $K_{vc}$, and the physical capacitor capacitance value $K_{cstore}$. As such, in accordance with some example embodiments, the physical capacitor voltage range may provide for the physical capacitor 202, in coordination with the bi-directional current source 204 and the control circuitry 206, to operate as a virtual capacitor, according to some example embodiments, and emulate a larger capacitor with a capacitance of $K_{vc}$, despite having a smaller physical capacitance $K_{cstore}$.

The control circuitry 206 may therefore control the bi-directional current source 204 and the physical capacitor 202 to emulate a shunt capacitor electrically connected to the power distribution bus with a different capacitance than a capacitance of the capacitor 202 (e.g., higher or lower, depending on the application). As such, the control circuitry 206 may be configured to control the bi-directional current source 204 to absorb energy into the physical capacitor 202 from the power distribution bus 107 or deliver energy from the physical capacitor 202 to the power distribution bus 107. Further, the control circuitry 206 may be configured to, according to some example embodiments, control the bi-directional current source 204 and, in turn, a voltage across the physical capacitor 202 within a physical capacitor voltage range that is, for example, different than the operating bus voltage range and may be defined based on the various factors, such as the capacitance of the physical capacitor 202, the type of physical capacitor (e.g., electrolytic, ceramic, tantalum, film, super-capacitors), or the like. For example, the physical capacitor voltage range may be larger or smaller than an operating bus voltage range. Additionally or alternatively, according to some example embodiments, the physical capacitor voltage range may be shifted or offset from the operating bus voltage range such that, for example, the minimum or maximum physical capacitor voltages are lower than the minimum bus voltage. According to some example embodiments, the minimum physical capacitor voltage may be higher than the minimum bus voltage and the maximum physical capacitor voltage may be lower than the maximum bus voltage.

Accordingly, the control circuitry 206 may therefore control the bi-directional current source 204 and the physical capacitor 202 to emulate a shunt capacitor electrically connected to the power distribution bus with a different capacitance than a capacitance of the capacitor 202. The control circuitry 206 may be configured to determine the physical capacitor voltage range based on the shunt capacitance needed to support the bus voltage in view of the transients and fluctuations that are expected to be introduced on the power distribution bus 107 by the dynamic load 108, the bus voltage tolerance range, and the capacitance of physical capacitor 202. According to some example embodiments, the physical capacitor voltage range may differ from the operating bus voltage range.

Further, the control circuitry 206 may be configured to control the bi-directional current source 204 based on a current bus voltage $V_{bus}$ and a current voltage across the physical capacitor 202 $V_{store}$. Additionally or alternatively, the control circuitry 206 may be configured to determine an energy required by the power distribution bus 107 to maintain the bus voltage within the operating bus voltage range and adjust the voltage across the physical capacitor 202 within the physical capacitor voltage range to cause the physical capacitor 202 to supply the energy required by the power distribution bus 107. Additionally, or alternatively, the control circuitry 206 may be further configured to adjust the voltage across the physical capacitor 202 to be a value that is, for example, greater than the maximum bus voltage or less than the minimum bus voltage. As such, according to some example embodiments, the maximum physical capacitor voltage within the physical capacitor voltage range may, for example, be greater than the maximum bus voltage. Additionally or alternatively, a minimum physical capacitor voltage within the physical capacitor voltage range may, for example, be less than the minimum bus voltage.

Figure 5:
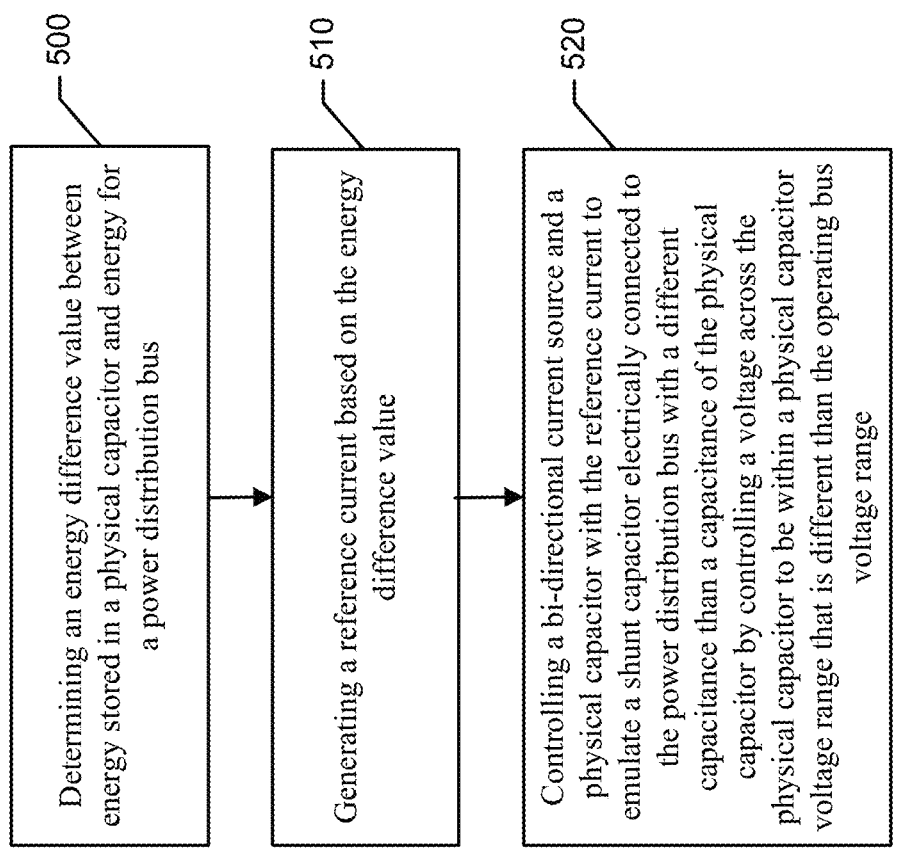
FIG. 5 illustrates a flowchart of an example method for implementing a virtual capacitor according to an example embodiment.

Now with reference to FIG. 5, a flowchart of an example method for implementing a virtual capacitor is provided. The example method may be performed by the virtual capacitor 210 or the control circuitry 206. In this regard, according to some example embodiments, the example method may include, at 500, determining, by the control circuitry 206, an energy difference value between energy stored in a physical capacitor 202 and energy for a power distribution bus 107. In this regard, the energy stored in the physical capacitor may be determined based on a physical capacitor voltage and the energy for the power distribution bus may be determined based upon a bus voltage. At 510, the example method may include generating a reference current based on the energy difference value. Also, at 520, the example method may include controlling, by control circuitry 206, a bi-directional current source 204 and a physical capacitor 202 with the reference current to emulate a shunt capacitor electrically connected to the power distribution bus with a different capacitance than a capacitance of the physical capacitor (e.g., higher or lower, depending on the application) by controlling a voltage across the physical capacitor to be within a physical capacitor voltage range that is different than the operating bus voltage range.

According to some example embodiments, the example method may further comprise controlling the bi-directional current source 204 based on a measured bus voltage and a measured voltage across the physical capacitor 202 (i.e., the physical capacitor voltage). Additionally or alternatively, the example method may further comprise determining an energy required by the power distribution bus to maintain the bus voltage within the operating bus voltage range and adjusting the voltage across the physical capacitor within the physical capacitor voltage range to cause the physical capacitor to absorb or deliver energy required by the power distribution bus. Additionally, according to some example embodiments, the example method may further comprise adjusting the voltage across the physical capacitor to be a value that is greater than the maximum bus voltage or less than the minimum bus voltage. Additionally or alternatively, the bi-directional current source and the physical capacitor may be electrically connected in series and an assembly including the bi-directional current source and the physical capacitor may be electrically connected in shunt to power distribution bus. Additionally or alternatively, a maximum physical capacitor voltage within the physical capacitor voltage range may be greater than the maximum bus voltage or less than the minimum bus voltage.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A power system comprising: an alternating current (AC) generator;
an AC to direct current (DC) converter coupled between the generator and a dynamically changing load, an output of the AC to DC converter being electrically coupled to a power distribution bus; control circuitry; a physical capacitor; and
a bi-directional current source electrically coupled in series between the physical capacitor and the power distribution bus, wherein the control circuitry is configured to determine an enemy difference value between enemy stored in the physical capacitor and energy for the power distribution bus, the enemy stored in the physical capacitor being based on a physical capacitor voltage and the enemy for the power distribution bus being based on a bus voltage; generate a reference current based on the energy difference value; and control the bi-directional current source and the physical capacitor with the reference current to emulate a shunt capacitor electrically connected to the power distribution bus with a different capacitance than a capacitance of the physical capacitor by controlling a voltage across the physical capacitor to be within a physical capacitor voltage range that is different than an operating bus voltage range.

2. The power system of claim 1, wherein the control circuitry is configured to control bi-directional current source based on a measured bus voltage and a measured voltage across the physical capacitor.

3. The power system of claim 1, wherein the control circuitry is configured to determine an energy required by the power distribution bus to maintain the bus voltage within the operating bus voltage range and adjust the voltage across the physical capacitor within the physical capacitor voltage range to cause the physical capacitor to absorb or deliver the energy required by the power distribution bus.

4. The power system of claim 3, wherein the control circuitry is further configured to adjust the voltage across the physical capacitor to be a value that is greater than a maximum bus voltage or less than a minimum bus voltage.

5. The power system of claim 1, wherein the bi-directional current source and the physical capacitor are electrically connected in series and an assembly including the bi-directional current source and the physical capacitor is electrically connected in shunt to power distribution bus.

6. The power system of claim 1, wherein a maximum physical capacitor voltage within the physical capacitor voltage range is greater than a maximum bus voltage or less than a minimum bus voltage.

7. The power system of claim 1, wherein a minimum physical capacitor voltage within the physical capacitor voltage range is less than a minimum bus voltage or more than a maximum bus voltage.

8. A method for implementing a virtual capacitor, the method comprising:
   determining an energy difference value between energy stored in a physical capacitor and energy for a power distribution bus, the energy stored in the physical capacitor being based on a physical capacitor voltage and the energy for the power distribution bus being based on a bus voltage;
   generating a reference current based on the energy difference value; and
   controlling, by control circuitry, a bi-directional current source and the physical capacitor with the reference current to emulate a shunt capacitor electrically connected to the power distribution bus with a different capacitance than a capacitance of the physical capacitor by controlling a voltage across the physical capacitor to be within a physical capacitor voltage range that is different than an operating bus voltage range, wherein the bi-directional current source is electrically coupled in series between the physical capacitor and the power distribution bus.

9. The method of claim 8, further comprising controlling the bi-directional current source based on a measured bus voltage and a measured voltage across the physical capacitor.

10. The method of claim 8, further comprising determining an energy required by the power distribution bus to maintain the bus voltage within the operating bus voltage range and adjusting the voltage across the physical capacitor within the physical capacitor voltage range to cause the physical capacitor to absorb or deliver energy required by the power distribution bus.

11. The method of claim 10, further comprising adjusting the voltage across the physical capacitor to be a value that is greater than a maximum bus voltage or less than a minimum bus voltage.

12. The method of claim 8, wherein the bi-directional current source and the physical capacitor are electrically connected in series and an assembly including the bi-directional current source and the physical capacitor is electrically connected in shunt to power distribution bus.

13. The method of claim 8, wherein a maximum physical capacitor voltage within the physical capacitor voltage range is greater than a maximum bus voltage or less than a minimum bus voltage.

14. The method of claim 8, wherein the bi-directional current source is electrically coupled between the physical capacitor and the power distribution bus.

15. The method of claim 14, wherein an alternating current (AC) generator is electrically coupled to an AC to direct current (DC) converter, the AC to DC converter being electrically coupled between the AC generator and the power distribution bus such that an output of the AC to DC;
   wherein a dynamically changing load is electrically coupled to and powered by the power distribution bus.

16. The method of claim 8, wherein the energy difference value is a function of a selected capacitance value for the virtual capacitor ($K_{vc}$).

17. The method of claim 8, wherein a minimum physical capacitor voltage within the physical capacitor voltage range is less than a minimum bus voltage or more than a maximum bus voltage.

* * * * *